United States Patent

Sato et al.

[11] Patent Number: 5,239,623
[45] Date of Patent: Aug. 24, 1993

[54] THREE-DIMENSIONAL IMAGE GENERATOR

[75] Inventors: Takuro Sato; Manabu Kawabe; Toshio Kato; Kiyohito Tokuda, all of Tokyo, Japan

[73] Assignee: Oki Electric Industry Co., Ltd., Tokyo, Japan

[21] Appl. No.: 424,703

[22] Filed: Oct. 20, 1989

[30] Foreign Application Priority Data

Oct. 25, 1988 [JP] Japan .................. 63-267233

[51] Int. Cl.⁵ .................................. G06F 15/62
[52] U.S. Cl. .................. 395/119; 395/129; 395/130
[58] Field of Search .................. 364/518–522, 364/554, 717; 340/729

[56] References Cited

U.S. PATENT DOCUMENTS 4,694,407 9/1987 Ogden .................. 364/518
4,827,252 5/1989 Busbridge et al. .................. 340/729

FOREIGN PATENT DOCUMENTS 2176678 12/1986 United Kingdom .

OTHER PUBLICATIONS

Gary A. Mastin, Peter A. Watterberg and John F. Mareda, *Fourier Synthesis of Ocean Scenes*, I.E.E.E. Computer Graphics & Applications, No. 3, pp. 16–23, Mar., 1987, New York, N.Y.

*Primary Examiner*—Gary V. Harkcom
*Assistant Examiner*—Almis Jankus
*Attorney, Agent, or Firm*—Edward D. Manzo

[57] ABSTRACT

A three-dimensional image generator generates a random signal which it filters in two dimensions generate a realistic three-dimensional image of a natural object such as ocean waves or clouds. By performing the filtering operation repeatedly on overlapping intervals of the random signal, related images can be obtained to generate moving scenes at real-time rates. Two or more partial image generators can be connected in parallel to generate different directions of motion, or different parts of a complex scene. Within each partial image generator, two or more space filters can be connected in parallel to generate superimposed patterns, such as small ripples superimposed on large waves. This image generator is much faster than previous, fractal image generators.

1 Claim, 5 Drawing Sheets

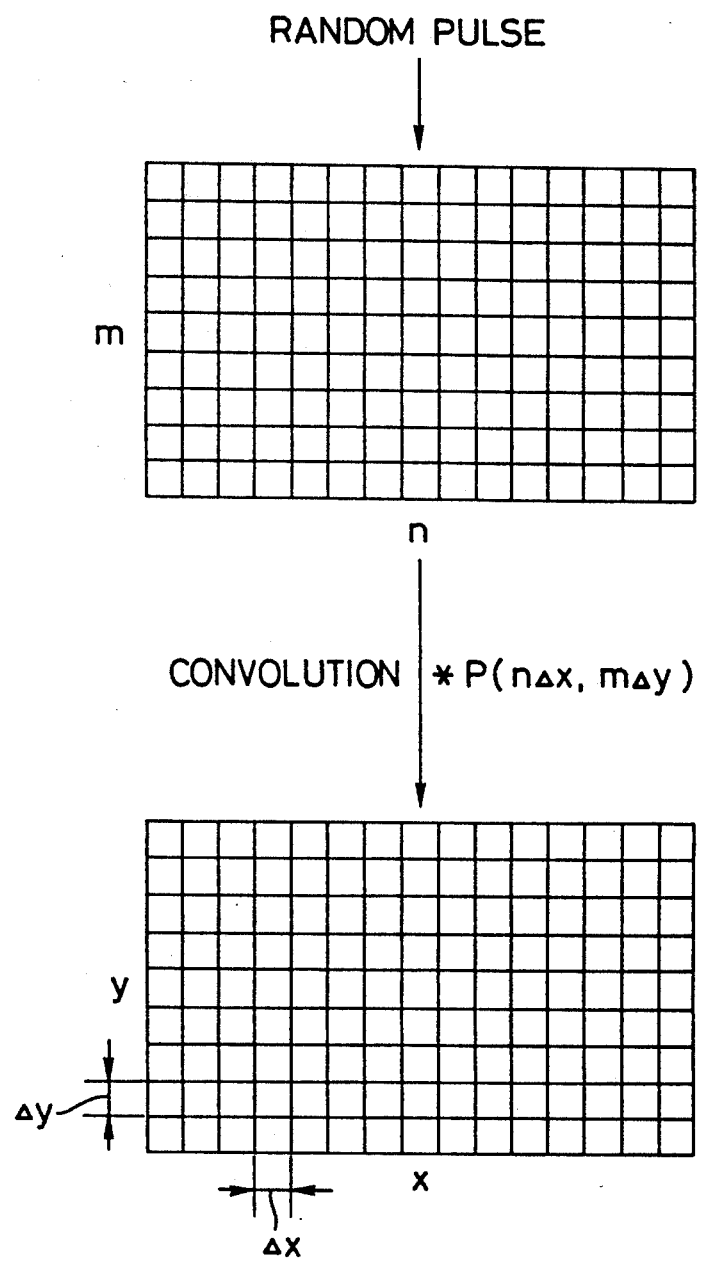

THREE-DIMENSIONAL IMAGE GENERATOR

BACKGROUND OF THE INVENTION

This invention relates to a three-dimensional image generator for generating images of natural objects such as waves on the surface of the sea or a forest blown by the wind, more particularly to a three-dimensional image generator capable of generating dynamic images in real time.

The modeling of natural scenery such as waves, clouds, mountains, and forests is an important field of computer graphics, having applications in such areas as animated movies, commercial advertising, and flight training simulation. The detail in such models is generated using stochastic (probabilistic) techniques, often founded on mathematical fractal (fractional dimension) theory.

One prior-art technique employs pairs of fractal or extended fractal waves representative of stochastic processes propagating in different directions. The waves in each pair are multiplied together and the products added to generate realistic images of three-dimensional natural scenes.

The generation of fractal images is a computationally intensive, time-consuming process, however. A minute and a half is required to produce a single, static image by the method above. Fractal techniques are therefore unsuitable for creating dynamic images (moving pictures), and are incapable of generating dynamic images in real time.

Many schemes for real-time output of three-dimensional moving images have been proposed, but they can only represent simple motions such as rotation, translation, reduction, and enlargement. They cannot duplicate complex, irregular motions such as ocean waves or a forest blowing in the wind.

Another problem in the prior art is that when a scene includes several types of natural objects, such as mountains, clouds, and sea, they must be generated separately, then combined. This further complicates the creation of real-time dynamic images.

SUMMARY OF THE INVENTION

It is accordingly an object of the present invention to generate dynamic three-dimensional images of natural objects in real time.

Another object is to generate static three-dimensional images of natural objects at high speed.

A further object is to combine images of different natural objects in real time.

A three-dimensional image generator comprises a random signal generator for generating a random signal, a space filter for receiving the random signal and performing a two-dimensional filtering operation to generate a three-dimensional image, space rotation means for rotating the three-dimensional image according to a viewing position, and image output means for displaying the image.

For a dynamic three-dimensional image, the space filter performs repeated filtering operations, using overlapping intervals of the random signal, to generate successive three-dimensional images.

Instead of a single space filter, the three-dimensional image generator may comprise a plurality of space filters, the outputs of which are combined by a filter output combiner.

A three-dimensional image generator may comprise a plurality of partial image generators, each having a random signal generator and one or more space filters as described above. Such a three-dimensional image generator also has space synthesis means for receiving the three-dimensional images generated by the partial image generators and combining them to create a synthesized three-dimensional image, space rotation means for rotating the synthesized three-dimensional image according to a viewing position, and image output means for displaying the image.

BRIEF DESCRIPTION OF THE DRAWINGS

FIG. 5 is a schematic diagram illustrating the space filter process.

DETAILED DESCRIPTION OF THE EMBODIMENTS

A first three-dimensional image generator will be described with reference to FIGS. 1 to 6. A second three-dimensional image generator will be described with reference to FIG. 7.

To give concrete examples, the description will deal with the generation of dynamic images of ocean waves. A three-dimensional image will be generated internally as a mathematical function representing the height of the waves over an x-y plane. The image will then be rotated in space for display as it would be seen by a viewer at a specific position. Successive images generated in this way will simulate a moving picture of waves on the sea. It will be understood that the same technique can be used to generate images of other natural objects such as landscapes or clouds.

Figure 1:
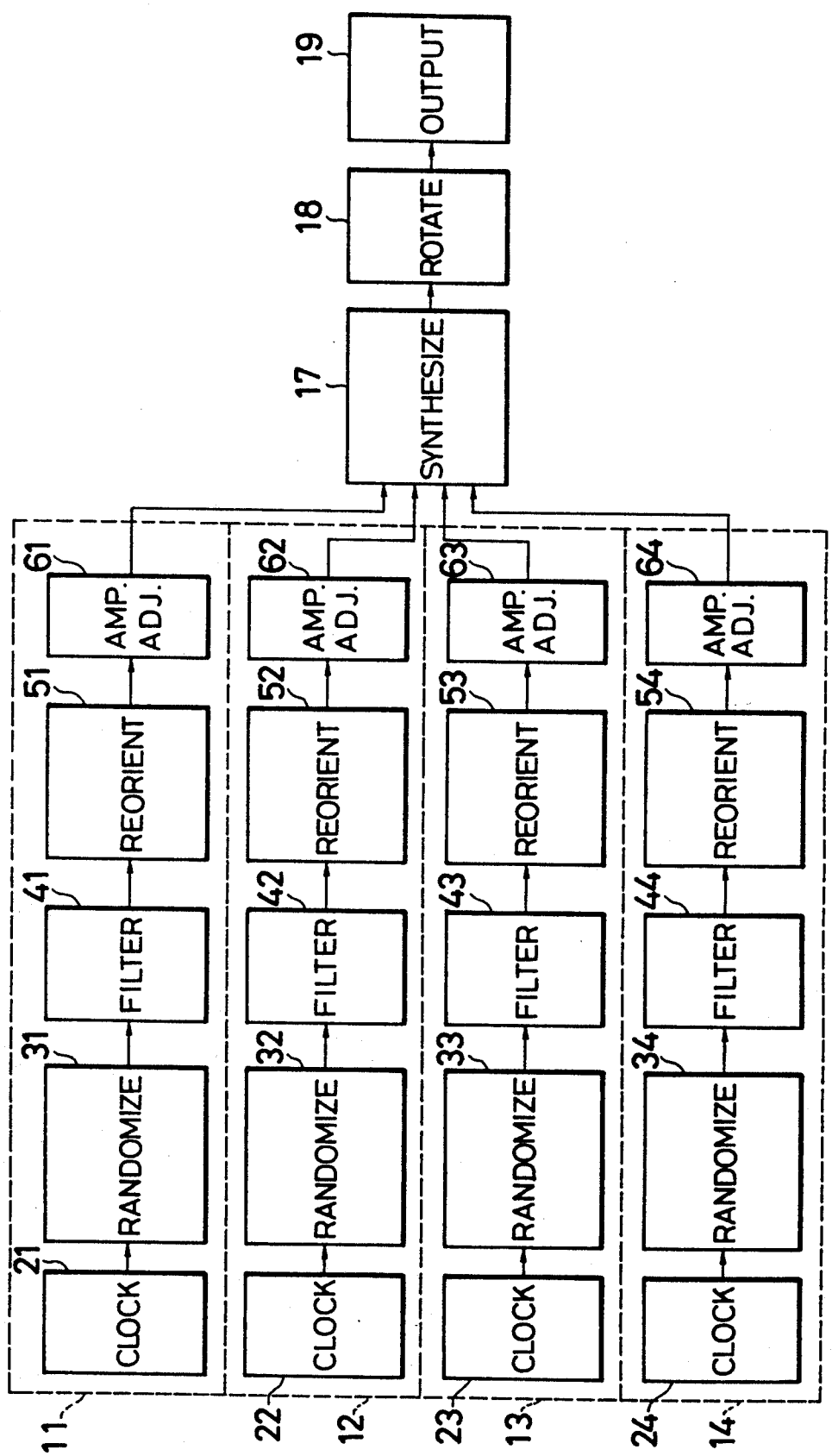
FIG. 1 is a block diagram of a three-dimensional image generator.

FIG. 1 is a block diagram of the first three-dimensional image generator, which comprises four partial image generators 11, 12, 13, and 14, a space synthesis means 17, a space rotation means 18, and an output means 19. The partial image generators 11 to 14 generate images of waves traveling in different directions. The space synthesis means 17 combines these into a single three-dimensional image representing the surface of the sea. The space rotation means 18 rotates the three-dimensional image according to a desired viewing position. The output means 19 receives this space-rotated image and displays it for view.

The partial image generators 11 to 14 comprise clock pulse generators 21 to 24, random signal generators 31 to 34, space filters 41 to 44, reorientation means 51 to 54, and amplitude adjustment means 61 to 64, respectively. Within each partial image generator, these are connected in series in the above order. The outputs of the amplitude adjustment means 61 to 64 are furnished to the space synthesis means 17.

Each of the clock pulse generators 21 to 24 generates a clock pulse signal. Well-known clock pulse generators employing crystal oscillators and divider circuits, for example, can be used. The clock pulse signals are furnished to respective random signal generators 31 to 34.

The random signal generators 31 to 34 convert the input clock pulses to pulse signals in which the occurrence of logic "1" and logic "0" is randomized. For example, the random signal generators 31 to 34 can be structured so that at each clock cycle there is a 50% probability of generating a "1" pulse and a 50% probability of generating a "0" pulse. Well-known M-series techniques can be used to generate such random pulses. For examples, the M series of seven, having a repetition cycle of 127, can be applied. The random pulse signals are furnished to the space filters 41 to 44.

The space filters 41 to 44 treat the random pulse signals as if they represented power spectra of mathematical functions of two variables (x and y). A filtering operation is performed that transforms each power spectrum to a function representing height over the x-y plane, thus representing a three-dimensional image. Four such three-dimensional images are obtained, one from each of the space filters 41 to 44.

The surface defined by the function in each three dimensional image has irregular height variations that mimic, for example, waves on the surface of the sea. Since the three-dimensional images given by the four functions are combined to create the final image, they will be referred to as or precursor images.

To generate its first image, a space filter requires a number of clock pulses equal to, for example, the number of dots in the image. After generating an initial image, however, a space filter can generate successive images at the rate of one image per clock cycle, as will be described later. Successive partial images from the same space filter differ only slightly, the difference being such that the waves appear to travel in, for example, the negative x-direction, changing in shape as they travel.

Figure 2:
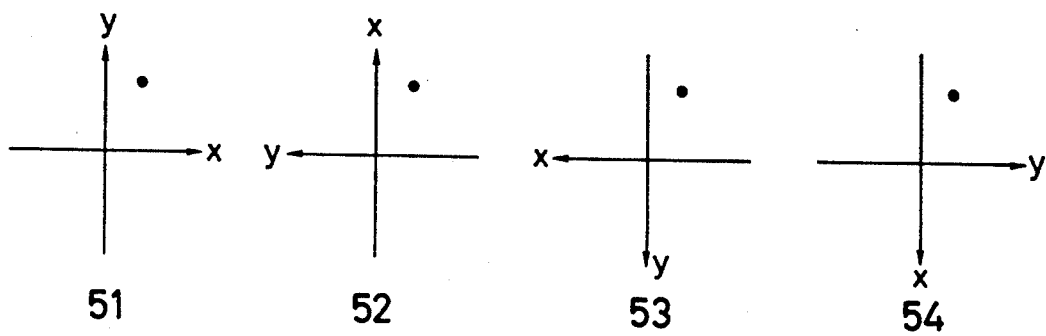
FIG. 2 is a schematic diagram illustrating image reorientation.

The partial three-dimensional images obtained from the space filters 41 to 44 are furnished to the reorientation means 51 to 54. The reorientation means 51 to 54 rotate the coordinates of the input partial images in steps of 90° as shown in FIG. 2. Thus in the partial image output from the reorientation means 52 the waves travel east, for example, while in the partial image output from the reorientation mean 51 they travel north, in the partial image output from the reorientation means 53 they travel west, and in the partial image output from the reorientation means 54 they travel south.

The reoriented partial images output from the reorientation means 51 to 54 are furnished to respective amplitude adjustment means 61 to 64. The amplitude adjustment means 61 to 64 perform a mathematical amplification operation, adjusting the amplitudes of the images according to specified gain parameters. That is, they adjust the height of the waves in the images.

The four reoriented, adjusted partial images output from the partial image generators 11 to 14 are furnished to the space synthesis means 7, which combines them by adding the values of the functions at each point (x, y). If the amplitude adjustment means 61 to 64 have equal gains, the four directions of travel in the partial images cancel each other, and the combined three-dimensional image shows the surface of the sea rising and falling in a stationary manner. If the gains of the amplitude adjustment means 61 to 64 are unequal, however, the combined image shows waves traveling principally in the direction of the partial image having the largest gain.

By suitable adjustment of the four gains, the waves can be made to travel in any desired direction.

The synthesized three-dimensional image output from the space synthesis means 7 is furnished to the space rotation means 8. The space rotation means 8 performs a well-known transformation to present the synthesized, three-dimensional image as it would be seen from a certain viewing position. For example, it can rotate the image to represent the surface of the sea as seen by a person standing on the shore, or by a person flying in an airplane.

The space filters 41 to 44, reorientation means 51 to 54, amplitude adjustment means 61 to 64, image synthesis means 17, and space rotation means 18 can be built using standard arithmetic and logic circuits; their structures will be apparent to one skilled in the art. Alternatively, they can be implemented as programs running on a general-purpose computer.

The image output means 9 is, for example, a CRT display or printer that outputs the final three-dimensional image.

Next a more detailed description of the operation of the space filters 41 to 43 will be give with reference to FIGS. 3 to 6.

Figure 3:
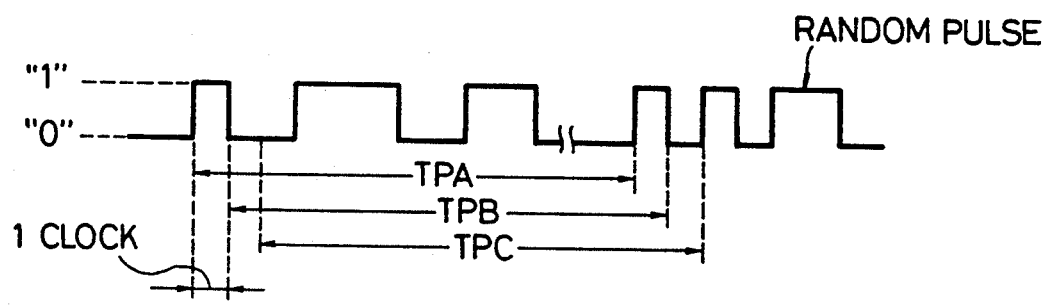
FIG. 3 is a block diagram showing the detailed conceptual structure of the space filters in FIG. 1.

FIG. 3 shows an example of a random signal generated by, for example, the random signal generator 31. In each clock cycle the signal has a random value of "1" or "0." To generate a partial image, the space filter 41 uses a certain interval of this random signal, such as the interval TPA in the drawing. Conceptually, the random values in respective clock cycles in this interval are assigned to point with integer coordinates in an n-m plane. For example, the first random value is assigned to the point (1, 1), the second random value is assigned to the point (1, 2), and so on, the values from the interval TPA filling a rectangular area in the n-m plane.

The x-y plane over which the image will be generated will be referred to as the space domain. The n-m plane represents the corresponding frequency domain: n represents frequency in the x-direction; m represents frequency in the y-direction. The random values assigned to the n-m plane represent the power spectrum of a highly disordered function in the space domain: for example, a function depicting a sea with an unnaturally chaotic surface.

Figure 4:
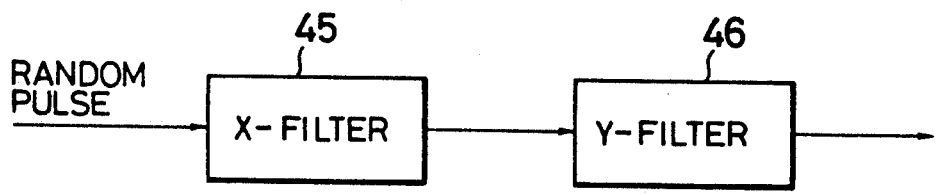
FIG. 4 is a signal waveform chart showing overlapping intervals of a random pulse signal.
Figure 6A:
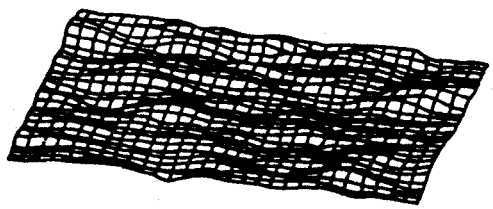
FIG. 6 illustrates dynamic sea waves generated by the three-dimensional image generator in FIG. 1.
Figure 6B:
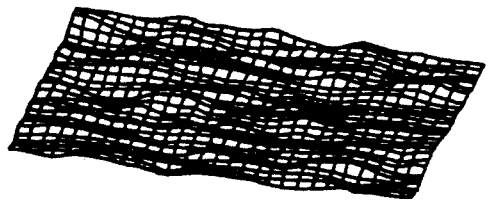
Figure 6C:
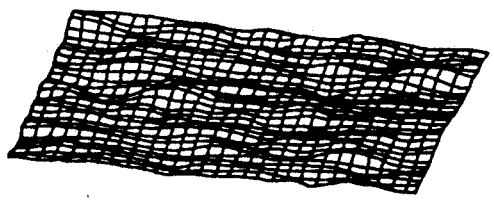
Figure 6D:
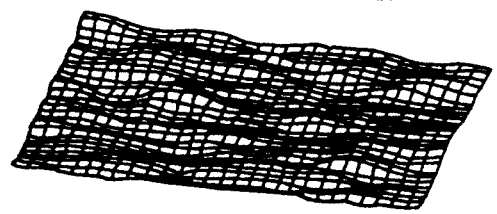
Figure 6E:
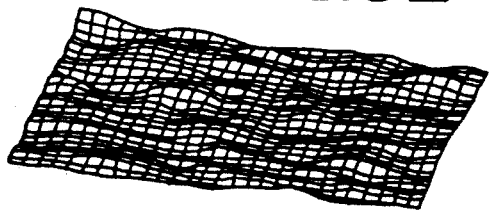
Figure 6F:
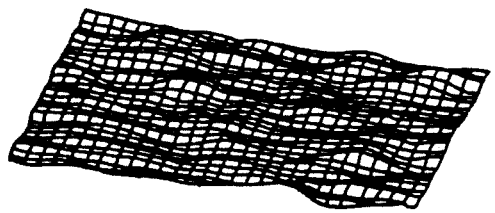
Figure 6G:
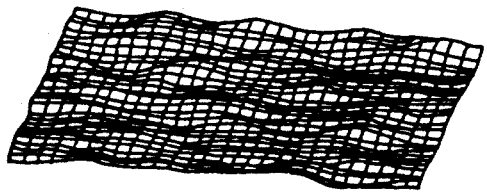
Figure 6H:
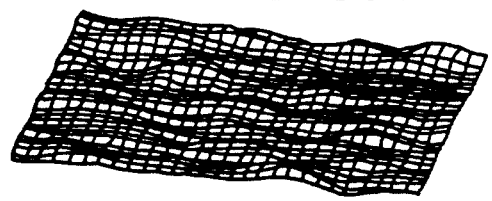
Figure 6I:
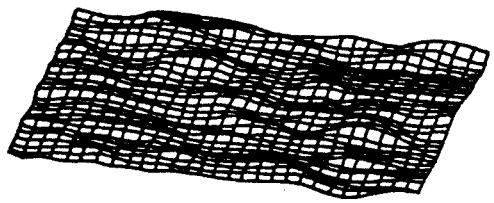
Figure 6J:
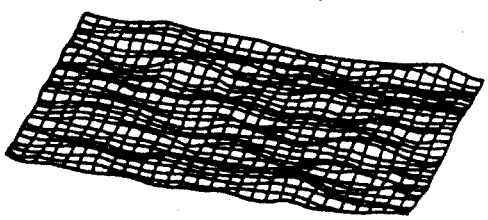

As shown schematically in FIG. 4, the space filter 41 can be mathematically described as comprising an x-direction filter 45 and a y-direction filter 46. The x-direction filter 45 performs a filtering operation on rows of values with identical m-coordinates in the n-m plane. The y-direction filter 46 then performs a filtering operation on columns of values with identical n-coordinates. These filtering operations reduce the disorder by attenuating certain frequency components in the power spectrum. Finally, an inverse Fourier transformation (not explicitly shown in the drawing) is performed to transform the filtered result to the space domain, obtaining a function on the x-y planes as the output of the space filter.

The operations of filtering in the x- and y-directions and the final inverse Fourier transformation can be combined into a single two-dimensional filtering operation. For example, the well-known two-dimensional Butterworth filter with a transfer function represented by the following power spectrum $P(n\Delta x, m\Delta y)$ can be used, where $$P(n\Delta x, m\Delta y) = \pi l_0^2 \sigma^2 \div \{1 + (\pi l_0^2 n\Delta x)^2\} \div \{1 + (\pi l_0^2 m\Delta y)^2\}.$$

The quantities $\Delta x$ and $\Delta y$ are scale factors representing the width of divisions between grid lines on which points are displayed in the x-y plane. The quantity $l_0$ is a correlation length parameter, which corresponds to the length until a qualitatively identical waveform next appears. $\sigma^2$ is a variance parameter, which indicates the degree of density variations in the waves. By performing a standard mathematical convolution operation on the random values in the n-m plane and the function $P(n\Delta x, m\Delta y)$, the space filter 41 obtains a function of x and y representing a partial image.

The other space filters 42 to 44 operate in the same way. Special-purpose hardware is available for performing these filtering operations, and can be used to carry out the filtering process at high speed.

The overall filtering operation is summarized in FIG. 5. The random values are assigned to the n-m plane, then convolved with $P(n\Delta x, m\Delta y)$ to obtain a function on the x-y plane, representing a partial three-dimensional image.

To obtain the next partial three-dimensional image, the space filter 41 shifts the interval of the random signal by one clock cycle and repeats the same operation. That is, it takes the random values in the overlapping interval TPB in FIG. 3, assigns these values to the n-m plane, and convolves them with $P(n\Delta x, m\Delta y)$ to obtain a new function on the x-y plane. For the next partial image after that, the interval TPC in FIG. 3 is used. One complete image is thus obtained for each clock cycle.

Since successive intervals overlap except for one clock cycle at each end, successive partial images are nearly identical. Each time the interval is shifted to the right in FIG. 3, a new value enters at, for example, the top right corner of the n-m plane in FIG. 5. The other values shift by one position to the left in FIG. 5, with values at the left edge wrapping around to the right edge and the value in the bottom left corner dropping out. In the x-y plane this makes the waves appear to shift slightly to the left.

Because of this relationship, each successive partial three-dimensional image can be obtained from the preceding one by relatively simple operations. Even using standard computing equipment, new partial images can be obtained at a rate of, for example, sixty images per second, which is more than adequate for real-time, dynamic image display.

The nature of the image obtained depends on the filter parameters of the space filters 41 to 44 and the gain parameters of the amplitude adjustment means 61 to 64. These parameters can be assigned arbitrarily, or can be selected on the basis of an analysis of the type of natural scene to be represented.

FIG. 6 shows a series of images generated by this three-dimensional image generator. The first image is at (A) and the last at (J). The filter parameters are adjusted to simulate ocean waves. The gain parameters are adjusted so that the waves appear to travel mainly in the positive y-direction (up in the drawing). As the waves travel, they can be seen undergo subtle changes in shape.

A second three-dimensional image generator will be described with reference to FIG. 7. The second three-dimensional image generator is identical to the first one shown in FIG. 1 except that each partial image generator has a plurality of space filters instead of just one.

The reason for this is that if a wave traveling in a certain direction is observed closely, it will often be found to comprise a plurality of superimposed waves with differing periods and phases. On the sea, for example, one may observe ripples superimposed on waves which are in turn superimposed on swells. The purpose of the multiple space filters is to generate such superimposed waves.

Figure 7:
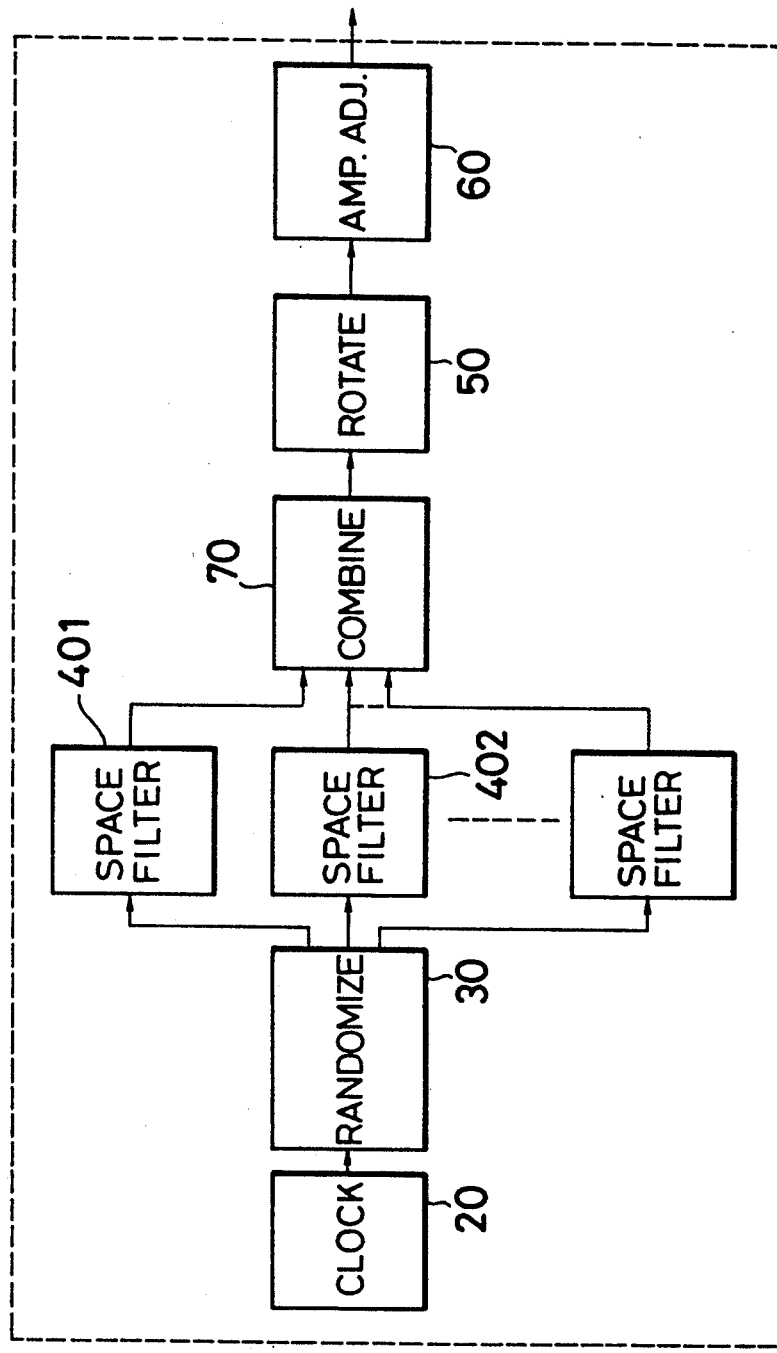
FIG. 7 is a block diagram of a partial image generator employing multiple space filters.

FIG. 7 illustrates one partial image generator 10 in the second three-dimensional image generator, comprising a clock pulse generator 20, a random signal generator 30, a plurality of space filters 401, 402, . . . , reorientation means 50, and amplitude adjustment means 60. These elements are identical to the corresponding elements in FIG. 1, each of the space filters 401, 402, . . . having the structure described in FIGS. 4 and 5. The random signal generated by the random signal generator 30 is supplied separately to the space filters 401, 402, . . . .

The three-dimensional images output by the space filters 401, 402, . . . are supplied to a filter output combiner 70, which combines these images additively to generate a single combined, partial three-dimensional image. This combined partial image is then reoriented by the reorientation means 50 and adjusted in amplitude by the amplitude adjustment means 60 to produce a reoriented, adjusted partial image.

The second three-dimensional image generator comprises four partial image generators of the structure shown in FIG. 7. Their partial image outputs are combined by a space synthesis means and rotated in space in the same way as in FIG. 1 to generate the final image.

The filter parameters of the space filters 401, 402, . . . can be set independently to generate waves differing in their amplitude, frequency, and phase relationships, but all traveling in the same direction. Superimposition of these waves yields dynamic images that appear even more natural than the images produced by the first three-dimensional image generator.

The scope of this invention is not limited to the structures shown in the drawings, but includes many modifications that will be apparent to one skilled in the art.

For example, the number of partial image generators need not be four as in FIG. 1; it can be any number equal to or greater than one. If there is only one partial image generator, the reorientation means and space synthesis means are unnecessary, and the amplitude adjustment means can also be omitted.

Instead of using the partial image generators to generate images with waves moving in different directions, it is also possible to use them to generate different components of a total image. For example, one partial image generator (or set of partial image generators) could generate an image of the sea, another could generate an image of clouds, and another could generate an image of mountains. The clock pulses for different partial image generators need not run at the same rate, but can be adjusted according to the type of object. For example, the clock pulses for the sea image could run faster than the clock pulses for the cloud image. The clock pulses for the mountain image could be stopped, once the initial images has been generated, so that the mountains do not move. Stopping the clock of a partial image generator provides a particularly convenient way to combine dynamic and static images.

When two or more partial image generators use the same clock rate, they can share the same clock pulse generator instead of having separate clock pulse generators as shown in FIG. 1.

The space filters need not be Butterworth filters; other types of filters such as Gaussian filters, ARMA (auto-regression moving average) filters, or AR (auto-regression) filters can be used instead. The type of filter can be selected according to the intended natural object.

The space filtering operation dose not have to be performed directly on the random signals; it can be preceded by a fast Fourier transform. In this case the random signals represent a chaotic surface in the space domain. The fourier transform converts this surface to a power spectrum in the frequency domain. The filtering operation alters the power spectrum and converts it back to the space domain.

It is not necessary to provide a reorientation means for every partial image generator. The reorientation means in one of the partial image generators can be omitted, leaving its partial image unrotated. The other partial images can then be rotated with respect to the unrotated partial image.

Instead of a digital random signal, a random analog signal can be generated. The space filtering and other operations can also be carried out by analog means.

Applications of this invention are not limited to dynamic images. Three-dimensional static images can be obtained by performing the space filtering just once, instead of repeatedly.

What is claimed is:

1. A method for generating a three-dimensional image comprising the steps of:

generating a plurality of precursor image signals in a plurality of image generators;

combining said plurality of precursor image signals in a space synthesis means to generate a three-dimensional image signal;

processing said three-dimensional image signal thereby to rotate a three-dimensional image represented by said signal in a space rotation means according to a desired view; and outputting said rotated three-dimensional image signal;

said step of generating a plurality of precursor image signals including:

generating a clock pulse signal;

converting said clock pulse signal into a random signal including a plurality of random values;

using a certain interval of said random signal wherein each one of said plurality of random values is correlated to one of a plurality of points with integer coordinates in an n-m plane representing a frequency domain;

filtering said plurality of points to attenuate certain ones of said plurality of points;

transforming said filtered plurality of points to coordinates of a space domain wherein a precursor image is generated;

generating other precursor images by repeating the previous three said steps using successive overlapping intervals wherein one of said successive overlapping intervals overlaps said interval;

rotating said coordinates of said space domain 90°; and adjusting a plurality of amplitudes of said precursor image and said other precursor images according to specified gain parameters;

wherein said further steps of said process comprise combining said precursor image and said other precursor images into a three-dimensional image;

transforming said three-dimensional image as it would be viewed from a certain position; and outputting said transformed three-dimensional image.

* * * * *